(12) United States Patent
Brennum

(10) Patent No.: US 9,137,168 B2
(45) Date of Patent: Sep. 15, 2015

(54) METHOD, DEVICE AND SYSTEM FOR PACKET TRANSMISSION OVER IP NETWORKS

(75) Inventor: Halvard Brennum, Slependen (NO)

(73) Assignee: APPEAR TV AS (NO)

( * ) Notice: Subject to any disclaimer, the term of this patent is extended or adjusted under 35 U.S.C. 154(b) by 0 days.

(21) Appl. No.: 14/382,748

(22) PCT Filed: Mar. 6, 2012

(86) PCT No.: PCT/EP2012/053827
§ 371 (c)(1),
(2), (4) Date: Sep. 3, 2014

(87) PCT Pub. No.: WO2013/131561
PCT Pub. Date: Sep. 12, 2013

(65) Prior Publication Data
US 2015/0026542 A1    Jan. 22, 2015

(51) Int. Cl.
*H04L 12/863* (2013.01)
*H04L 29/06* (2006.01)
*H04N 21/438* (2011.01)
*H04N 21/63* (2011.01)
*H04N 21/643* (2011.01)
*H04N 21/6437* (2011.01)
*G06F 11/10* (2006.01)
*H04L 1/00* (2006.01)
(Continued)

(52) U.S. Cl.
CPC .............. *H04L 47/625* (2013.01); *G06F 11/10* (2013.01); *H04L 1/0045* (2013.01); *H04L 45/74* (2013.01); *H04L 47/32* (2013.01); *H04L 65/4076* (2013.01); *H04L 65/604* (2013.01); *H04L 65/605* (2013.01); *H04L 65/80* (2013.01); *H04N 21/4381* (2013.01); *H04N 21/631* (2013.01); *H04N 21/6437* (2013.01); *H04N 21/64322* (2013.01)

(58) Field of Classification Search
CPC ..................................................... H04L 1/0057
USPC .................................. 714/776, 774; 370/473
See application file for complete search history.

(56) References Cited

U.S. PATENT DOCUMENTS

| | | | |
|---|---|---|---|
| 6,839,865 | B2 | 1/2005 | Gould et al. |
| 7,796,598 | B2 | 9/2010 | Pereira et al. |
| 7,864,805 | B2 * | 1/2011 | Hannuksela .................. 370/473 |

(Continued)

FOREIGN PATENT DOCUMENTS

| | | |
|---|---|---|
| EP | 1300991 A1 | 10/2001 |
| EP | 2119228 A1 | 9/2009 |

(Continued)

OTHER PUBLICATIONS

UKIPO Search Report, GB1203958.2, Jul. 3, 2012.
(Continued)

*Primary Examiner* — Fritz Alphonse
(74) *Attorney, Agent, or Firm* — Polster Lieder

(57) ABSTRACT

A device, system and method for packet transmission over internet protocol (IP) networks in which redundant IP packet streams are generated by an IP transmitter and transmitted using separate network paths to one or more IP receivers, and at each IP receiver duplicate IP packets are overwritten to form a single combined packet stream with redundant IP packet streams reducing the negative effects of packet loss and of network congestion.

18 Claims, 11 Drawing Sheets

(51) Int. Cl.
*H04L 12/741* (2013.01)
*H04L 12/823* (2013.01)

(56) References Cited

U.S. PATENT DOCUMENTS

| | | | |
|---|---|---|---|
| 7,924,761 B1* | 4/2011 | Stevens | 370/315 |
| 2003/0229840 A1* | 12/2003 | Pattavina | 714/776 |
| 2005/0041653 A1 | 2/2005 | Arnold et al. | |
| 2007/0153679 A1 | 7/2007 | Jost et al. | |
| 2008/0049720 A1 | 2/2008 | Liu et al. | |
| 2009/0225676 A1 | 9/2009 | Kisela et al. | |
| 2010/0050058 A1 | 2/2010 | Long et al. | |

FOREIGN PATENT DOCUMENTS

| | | |
|---|---|---|
| GB | 2406467 A | 3/2005 |
| GB | 2500175 B | 8/2014 |
| WO | 2009007508 A1 | 1/2009 |
| WO | 2009026421 A1 | 2/2009 |
| WO | 2009045946 A3 | 4/2009 |
| WO | 2008112465 A1 | 9/2009 |
| WO | 2009126253 A1 | 10/2009 |

OTHER PUBLICATIONS

UKIPO Supplementary Search Report, GB1203958.2, May 21, 2014.
PCT Search Report, PCT/EP2012/053827, Nov. 28, 2012.

* cited by examiner

METHOD, DEVICE AND SYSTEM FOR PACKET TRANSMISSION OVER IP NETWORKS

CROSS-REFERENCE TO RELATED APPLICATIONS

This application is a National Stage of International Application No. PCT/EP2012/053827, filed Mar. 6, 2012, which was filed on the same day by the Applicant as GB Application No. 1203958.2 (Now GB Patent GB2500175), the disclosures of which are incorporated herein by reference.

FIELD OF THE INVENTION

The present invention relates generally to a method, a device and a system for packet transmission over IP (Internet protocol) networks. More particularly the present invention is particularly suited for, but not limited to, the transmission of video, audio and related data over IP networks.

DESCRIPTION OF THE RELATED ART

For the purposes of interoperability a series of standards have been developed for coded representation of digital audio and video and related data. The MPEG-2 standard applies to the generation of transport streams (TS) and the SMPTE-2022 standard applies to the transmission of a TS over IP networks according to the real-time transport protocol and user datagram protocol (RTP/UDP/IP) which is applicable to video broadcast systems. The SMPTE-2022 standard requires the original digital signal to be compressed, packed and then divided into a plurality of RTP packets for transmission. For improved transport efficiency of video packets UDP is adopted which removes the need for handshake and acknowledgements. This standard does not, though, address certain problems common to transport streams over IP networks. In an IP network when a bit error arises an entire IP packet will be dropped so that every IP packet either arrives at the IP receiver correctly or does not arrive at all. Also network router congestion may cause bursts of IP packets to be dropped in the network and IP packets may be duplicated or arrive out-of-order. However, in many video applications packet drops or losses and out-of-order packets are unacceptable so some form of error correction is needed.

Various methods have been proposed for compensating for packet drops in IP networks. One method involves the transmission of the multiple copies of the same content in independent streams. In U.S. Pat. No. 6,839,865, for example, a system is described which employs two multicast servers and a 'failover' device. The two multicast servers are synchronised to transmit identical content as TS simultaneously over an IP network. The failover device receives the TS from both multicast servers and designates one of the TS a primary stream and the other a secondary stream. The failover device separately buffers both multicast TS so that it has two identical copies of the same media packet separately buffered. The failover device overwrites the IP header information in the primary TS packets and re-transmits the TS to its network using only the buffer primary TS. The failover device monitors for any failures in the multicast TS and only when the failover device detects a failure in the primary TS does the failover device swap its transmission to the buffered secondary TS.

US 2007/0153679 also describes a method and apparatus which involves transmission of both a primary and a second stream across a network. With US 2007/0153679 both the primary and the secondary streams are received and buffered by the receiver which then synchronises the two streams and performs a packet selection process to create a "composite" stream. The packet selection process compares data from the same synch point in the two buffers and where the two data is identical the packet from the buffered primary stream is re-transmitted. Here too the device maintains separate buffers for each TS and selects a packet from one or other of the buffers for re-transmission. The synchronisation is performed at the MPEG-TS level where every component (audio, video, subtitles etc.) has its own sequence counters and the counters are only 4-bit. The limited sequence counters means that in many cases it would be impossible to re-create the TS if, for example, IP packets are re-ordered or duplicated or if several IP packets are lost from both redundant streams.

Similarly, in US 2008/0049720 a system and method for the transmission of content across an IP network is described which utilises both primary and secondary content streams. With this system, the receiver monitors for duplicate copies of received packets. Unlike the systems described earlier in US 2008/0049720 the primary and second content streams are not buffered. Instead, when a packet is received for the first time it is re-transmitted and where a packet is received a second time (i.e. from the secondary content stream) it is discarded. When a packet is received its packet sequence number is compared against a list of sequence numbers in memory of re-transmitted packets, if no match is found the packet is re-transmitted where a match is found the packet is discarded.

Alternatively, SMPTE (Society of Motion Picture and Television Engineers) 2022 is a transport protocol for the carriage of MPEG-2 Transport Streams over IP networks using RTP/UDP/IP transport protocol and which provides a forward error correction (FEC) scheme. This FEC scheme is based on transmitting additional out-of-band FEC packets which contain redundant information. FIG. 1 illustrates a conventional video/audio transporting process in which a transmitter in the form of an IP streamer 10 converts a digital video signal into a media packet stream compliant with the SMPTE 2022 transport protocol and transmits the media packet stream via an IP network 12 to one or more (two are shown in FIG. 1) IP receivers 20, which may be remote from the IP streamer 10.

The SMPTE 2022 FEC transport protocol works by arranging all IP media packets 14 into an $L_{column} \cdot D_{row}$ matrix before transmission (a 3 column, 4 row matrix is illustrated in FIG. 2). Using the transmitter matrix 10' one additional FEC packet 16 is generated for each row and each column of the transmitter matrix 10'. The FEC packet 16 is generated by summing (using an XOR operation) all IP packets for its respective row/column. SMPTE 2022 defines the number of IP packets in one FEC matrix to be in the range of 4 to 100, and the sequence number carried in the RTP header of each IP packet 14 is used to position every packet correctly within the transmitter FEC matrix 10' and the receiver FEC matrix 20'. Whenever a packet is dropped in the network 12, one packet position in the receiver FEC matrix 20' will be empty. However the missing packet may be regenerated by extracting the missing information from the relevant FEC packet 16.

FIG. 3 is a functional illustration of an implementation of the SMPTE 2022 FEC transport protocol in an IP receiver 20. In FIG. 3 the IP receiver 20 includes an IP input interface 22, a packet inspect module 24, a packet memory 26 and an FEC supervisor 28. The IP input interface 22 receives IP packets 14 from a single TS and FEC packets 16 from the network 12 and forwards the packets 14, 16 to the packet inspect module 24 which directs IP media packets 14 to the packet memory 26 and the FEC packets 16 to the FEC supervisor. The packet memory 26 contains one or more FEC receiver matrixes 20' and the IP media packets 14, forwarded from the packet inspect module 24, are stored at the matrix location specified in the IP media packet's RTP header. Whenever a FEC receiver matrix 20' is found to be missing an IP media packet 14, the FEC supervisor 28 regenerates the missing IP media packet 14 using the FEC packet 16 specific to the row and/or column of the FEC receiver matrix 20' in which a media packet is missing. Regeneration of the missing media packet is performed by subtracting from the relevant FEC packet 16 all the IP media packets in the relevant row or column; the remainder representing the missing media packet.

It will be apparent that with the SMPTE 2022 FEC protocol a maximum of one packet may be regenerated from each row and each column in the FEC matrix. This means that, whilst the SMPTE 2022 FEC transport protocol is capable of correcting most simple combinations of burst and single packet drops, many combinations of multiple packet drops and multiple burst drops cannot be recovered using this FEC scheme. More importantly, no FEC scheme is able to correct for a network link failure, where all packets are lost in the network due to power failure, equipment failure or cable failure.

In US 2010/0050058 a method and device utilising the SMPTE 2022 FEC protocol is described which enables the recovery of lost data but only in circumstances where the sequence number (SN) of a data packet has been modified. The method requires additional information to be generated by the IP transmitter and transmitted with either or both of the data packets and the FEC packets. The additional information denotes a relationship between data packets and their associated FEC packets that enables FEC packets to be used to recover lost data when the SN of a data packet has been altered. US 2010/0050058 does not, however, offer any solution where more than one data packet in the same row or column of the FEC matrix is lost.

It is to be understood that reference herein to video network transmission and to a video network transmission system is to be understood as including any method and system capable of transmitting video and/or audio with or without related data across an IP network.

SUMMARY OF THE INVENTION

The present invention generally seeks to address the problems described above.

The present invention seeks to provide an improved method, device and system for efficient utilisation of redundancy in digital video and audio and related data transmission over IP networks.

The present invention separately seeks to provide an improved method, device and system for transmitting video, audio and related data across an IP network utilising the SMPTE 2022 FEC protocol.

The present invention also seeks to provide an improved method, device and system utilising the SMPTE 2022 FEC protocol which enables packets to be recovered even in the event of multiple packet drops and multiple burst drops.

The present invention provides a method of packet transmission over IP networks, the method comprising: receiving a plurality of input IP media broadcast streams, each input stream consisting of a sequence of IP media packets of broadcast data and each input stream representing the same one or more media broadcasts; buffering each IP media packet; and outputting an output media broadcast stream using the buffered IP media packets, wherein, where a duplicate IP media packet is received which has identical broadcast data to an IP media packet previously buffered, the buffered IP media packet is overwritten with the duplicate IP media packet.

The present invention provides the equivalent of seamless switching between multiple IP network links and enables both network packet drop errors and network link errors to be corrected for a MPEG-2 TS transmitted over an IP network.

Preferably, each IP media packet includes header information containing packet ordering data, and the method further comprises reading the packet ordering data in the header information of each IP media packet and ordering the IP media packets in the buffer according to the packet ordering data.

Optionally, each one of the plurality of received input IP media broadcast streams includes forward error correction packets as part of a forward error correction scheme whereby ordering of the IP media packets in the buffer is in accordance with the forward error correction scheme and missing IP media packets are re-created using the forward error correction packets.

Additionally, the method may further comprise the step of monitoring the received input IP media broadcast streams and buffering forward error correction packets separately from the IP media packets. Also, where a duplicate forward error correction packet is received which has identical content to a forward error correction packet previously buffered, the buffered forward error correction packet may be overwritten with the duplicate forward error correction packet.

Ideally, the size of the IP media packet buffer is sufficient to store at least the total number of different IP media packets received during a time $2*\Delta_T$, where $\Delta_T$ is the maximum delay between duplicate IP media packets in different media broadcast streams whereby, after the IP media broadcast streams have been received, no synchronisation of different received media broadcast streams is performed.

In one preferred embodiment the buffered IP packets are output as the same media broadcast stream. Alternatively, the method includes the step of converting the buffered IP packets to a second format before outputting as a different output media broadcast stream.

Also, the method may further comprise an initial step of generating and transmitting a plurality of IP media broadcast streams each on a separate network path, each IP media broadcast stream consisting of a sequence of IP packets of broadcast data representing the same one or more media broadcasts.

Preferably, each of the plurality of IP media broadcast streams is generated in accordance with the SMPTE 2022 FEC transport protocol.

In a separate aspect the present invention provides a system for packet transmission over IP networks, the system comprising: a network transmitter adapted to generate a plurality of IP media broadcast streams, each IP media broadcast stream consisting of a sequence of IP media packets of broadcast data representing the same one or more media broadcasts, said transmitter being further adapted to transmit each IP media broadcast stream on a different IP network path; and a network receiver, the network receiver having: a network interface adapted to receive said plurality of IP media broadcast streams; a memory storage in which said IP media packets are buffered; an output interface adapted for outputting a media broadcast stream using the buffered IP media packets; and a controller for managing buffering of the IP media packets, the controller being adapted to overwrite a previously buffered IP media packet with a duplicate IP media packet where the duplicate IP media packet has identical broadcast data to the previously buffered IP media packet.

In a yet further aspect the present invention provides a network receiver for the receipt of packet transmissions over IP networks, the network receiver comprising: a network interface adapted to receive a plurality of IP media broadcast streams on a respectively plurality of network paths, each IP media broadcast stream consisting of a sequence of IP media packets of broadcast data; a memory storage in which said IP media packets are buffered; an output interface adapted for outputting a media broadcast stream using the buffered IP media packets; and a controller for managing buffering of the IP media packets, the controller being adapted to overwrite a previously buffered IP media packet with a duplicate IP media packet where the duplicate IP media packet has identical broadcast data to the previously buffered IP media packet.

In a still further aspect the present invention provides a tangible storage medium in which is stored program instructions for implementing the method set out above.

BRIEF DESCRIPTION OF THE DRAWINGS

These and other objects, advantages and novel features of the present invention will be more readily appreciated from the following detailed description when read in conjunction with the accompanying drawings, in which.

DETAILED DESCRIPTION OF THE PREFERRED EMBODIMENTS

Figure 1:
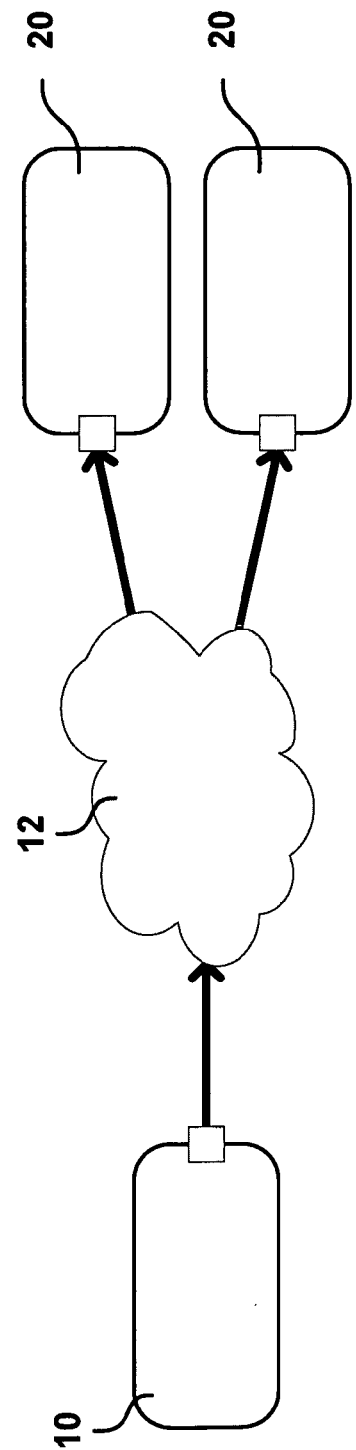
FIG. 1 illustrates a conventional video network transmission system.
Figure 2:
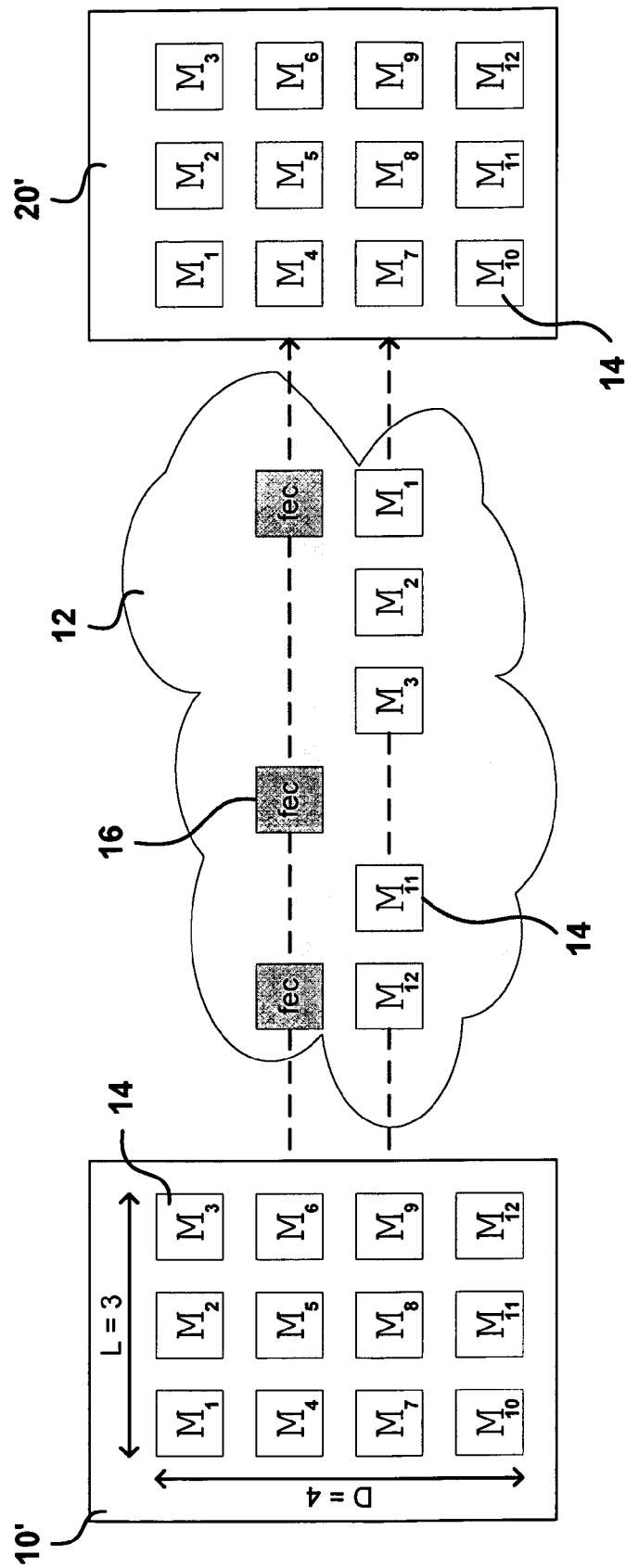
FIG. 2 illustrates application of the SMPTE 2022 FEC transport protocol to a video transmission over an IP network.
Figure 3:
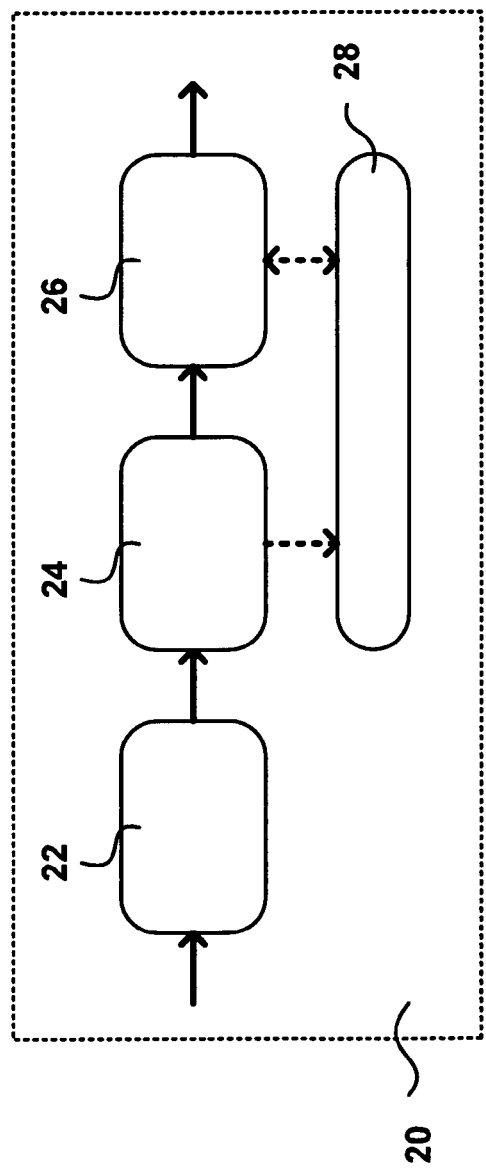
FIG. 3 is a functional illustration of an implementation of the SMPTE 2022 FEC transport protocol in an IP network receiver.
Figure 4:
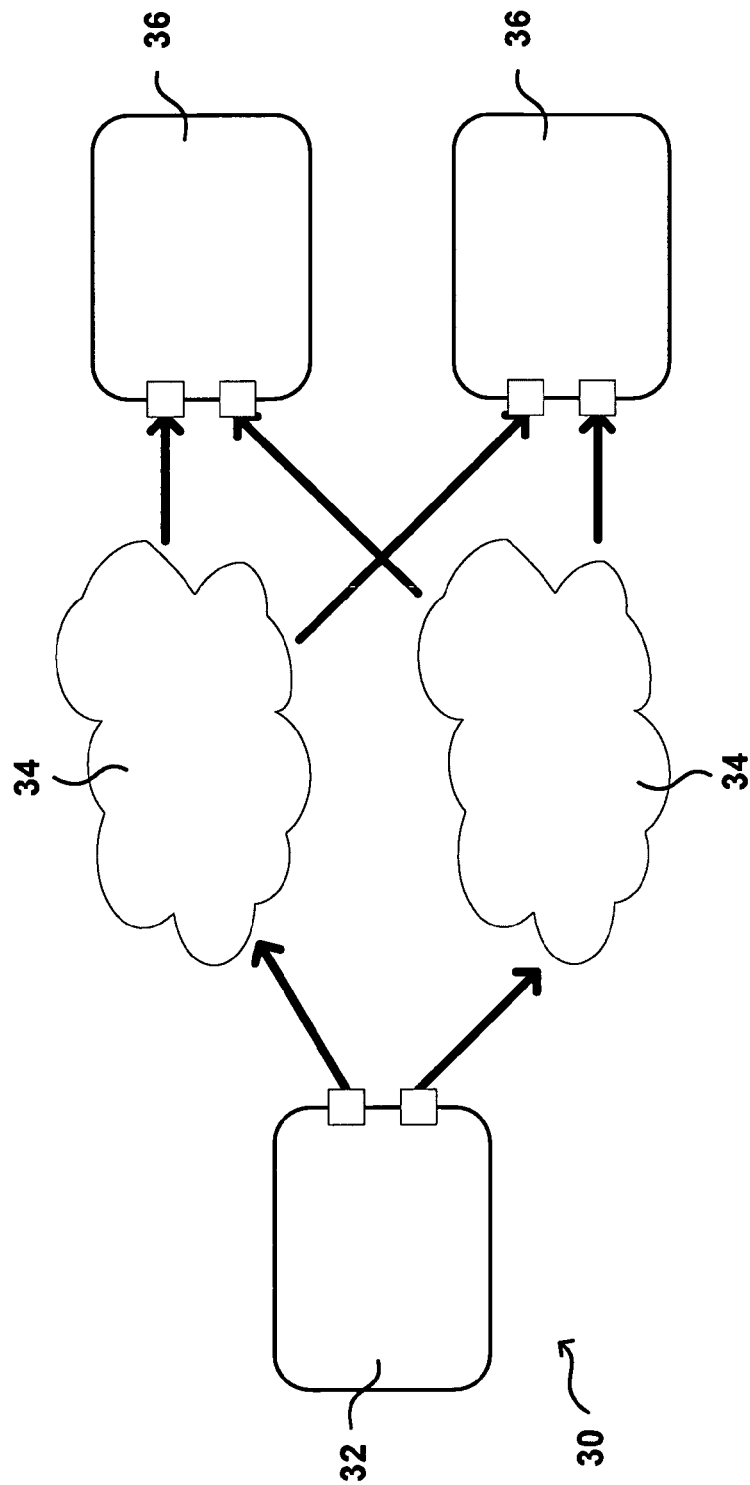
FIG. 4 schematically illustrates a video network transmission system in accordance with the present invention.

The video network transmission system 30 illustrated schematically in FIG. 4 comprises an IP network transmitter 32 in the form of an IP streamer with multiple outputs (two outputs are illustrated in FIG. 4); one or more networks 34 (two networks are shown in FIG. 4); and at least one IP receiver 36 (two IP receivers are shown in FIG. 4). The IP streamer 32 generates and transmits IP packets in a plurality of MPEG-2 TS using the RTP/UDP/IP transmission protocol. The video network transmission system 30 employs two or more redundant network paths (illustrated as separate networks in FIG. 4) and transmits a MPEG-2 TS across each and every redundant network path 34. The IP receiver 36 is adapted to receive duplicate IP packets from every redundant network path that is in use.

The video network transmission system 30 and in particular the IP receiver 36 is adapted to treat all duplicate IP packets from redundant network paths 34 as a special case of massive packet duplication. This enables duplicate packets from the redundant network paths to be managed without any special processing. The total combined data rate in the IP receiver 36 will be a multiple N of the transmitted data rate, where N is the number of redundant network paths used.

Figure 5:
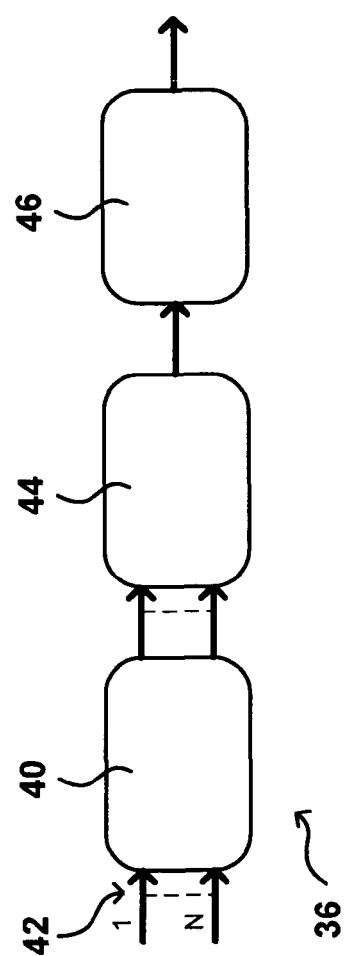
FIG. 5 is a functional illustration of a first IP network receiver in accordance with the present invention.

The IP receiver 36 is shown in greater detail in FIG. 5 and generally comprises an input interface 40 having a plurality of separate IP packet stream inputs 42; a packet memory 44; and an output 46. When a MPEG-2 TS is multicast across an IP network or a plurality of MPEG-2 TS of the same digital video signal are transmitted to the IP receiver 36, each packet stream input 42 of the input interface 40 receives a different one of the plurality of MPEG-2 packet streams.

Each of the IP packets is transferred from the input interface 40 to the packet memory 44, which acts as a buffer and packet stream combiner. A single packet stream is then read from the packet memory 44 and output via the receiver output 46. The sequence of the individual IP packets represented by their sequence numbers is maintained when the IP packets are written to the packet memory. Preferably this is done by ensuring the IP packets are stored in their sequence number order in the memory so that the packet stream is treated as an unbounded vector (i.e. a matrix with only one row). Other conventional methodologies for maintaining the sequence order of the IP packets in the packet memory may alternatively be employed for example, but not limited to, the use of a register in which an IP packet's sequence number is stored and linked to the IP packet's location in the packet memory. Here too the packet stream is treated as an unbounded vector but the ordering within the memory may not follow the sequence number. Instead the IP packets are accessed in order using the register.

It will be apparent that with the video IP transmission system 30 described herein identical IP packets having the same sequence number will be input to a plurality of different packet stream inputs 42. Where an IP packet with a particular sequence number is the first received with that sequence number it is written to a memory location in the packet memory 44 as described above. Where an IP packet with a particular sequence number is a duplicate of an identical IP packet previously received, the duplicate IP packet is assigned the same memory location in the packet memory 44 as the earlier identical IP packet. This methodology results in the earlier already stored identical IP packet being overwritten in the packet memory 44 by the later duplicate IP packet. This overwriting of earlier copies of the same IP packet does not cause problems as all packets that arrive at the IP receiver 36 are considered to be correct. The RTP header of the IP packet additionally includes a source identifier (SSRC) field which uniquely identifies the source of the packet stream. This avoids the overwriting of two IP packets with identical packet numbers from non-identical sources. Instead, IP packets with identical sequence numbers but different source identifiers are each separately stored.

By overwriting IP packets in the packet memory 44, the packet memory 44 functions as a buffer for the IP packet stream but also combines the multiple copies of the packet stream into a single stored packet stream. The stored packet stream is then read from the packet memory 44 for onward transmission via the receiver output 46.

Figure 6:
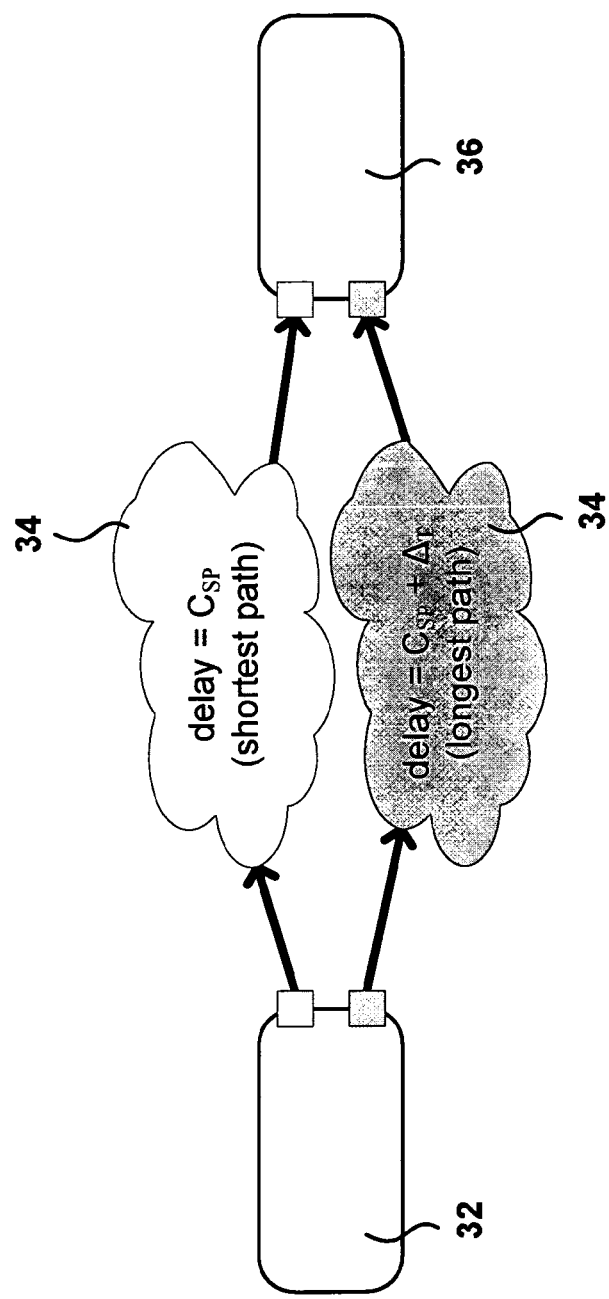
FIG. 6 illustrates network delays in the video network transmission system of FIG. 4.
Figure 7:
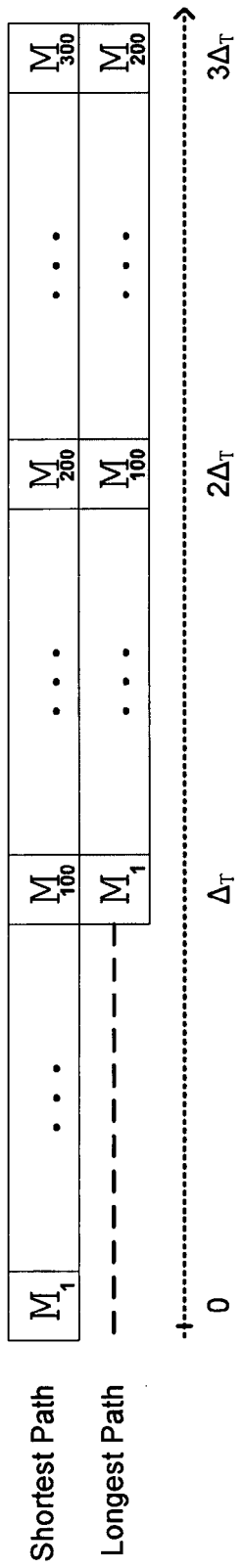
FIG. 7 is a first illustration of the effect of packet delays in the video network transmission system of FIG. 4.

As illustrated in FIG. 6, the network delay in different IP network paths may vary in the range of several hundred milliseconds. This has the effect that the first and the last identical media IP packets having the same sequence number in different packet streams will arrive at the IP receiver 36 with a $\Delta_T$ time window. So, as shown in FIG. 7 for example, where packet $M_1$ arrives at t=0 from the shortest network path, after $\Delta_T$ the identical packet with the same sequence number arrives from the longest network path.

If one packet is dropped in the shortest path network, the IP receiver 36 will have to wait up to $\Delta_T$ milliseconds before the redundant identical IP packet arrives through the longest path network. The packet memory 44 is therefore sufficiently large at least to buffer (and delay) all IP packets received within the $\Delta_T$ time window.

The time $\Delta_T$ is selected to cover the worst case packet delay difference between all redundant networks used, and ideally includes a provision for any packet jitter present in the IP networks. The time window $\Delta_T$ may be fixed for a particular IP network or, where the network system 30 includes a network performance monitor, the time window $\Delta_T$ may be adjustable to accommodate variations in network latency. Typically the transmission system is adapted to accommodate values of $\Delta_T$ up to a maximum of 500 ms.

Figure 8:
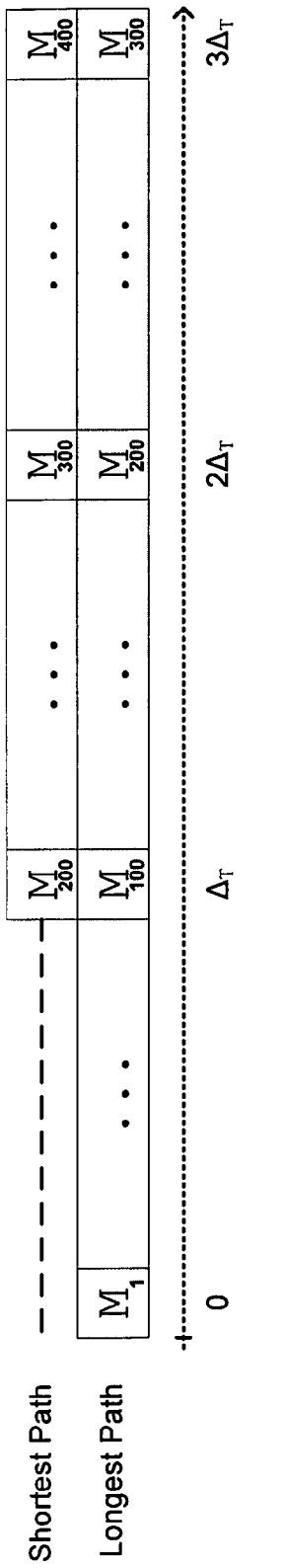
FIG. 8 is a second illustration of the effect of packet delays in the video network transmission system of FIG. 4.

When the first packet arrives at the IP receiver, it is not possible to determine whether this packet belongs to the shortest network path or the longest network path, because the link may be down on any network path at any time. As illustrated in FIG. 8, packet $M_1$ may arrive at t=0 from the longest network path and subsequent packets, $M_2 \ldots M_{100}$, arrive in turn from the same longest network path during time $\Delta_T$. At time $\Delta_T$ packet $M_{200}$ may then arrive from the shortest network path as a result of a temporary congestion problem on the shortest network path having been resolved.

In the case that the first duplicate packet arrives from the longest path, the packet memory 44 is required to be capable of buffering at least all IP packets within a $2*\Delta_T$ time window. The actual size of memory required will be dependent upon the total number of IP packets received in the $2*\Delta_T$ time window which, in turn, depends on the TS media bit rate and the chosen number of TS packets per IP frame.

In an alternative embodiment the video IP network transmission system described above may additionally implement the SMPTE 2022 FEC transport protocol on each of the redundant packet streams. In this alternative embodiment the IP streamer 32 generates two or more separate outputs each consisting of an identical stream of IP packets and FEC packets.

Figure 9:
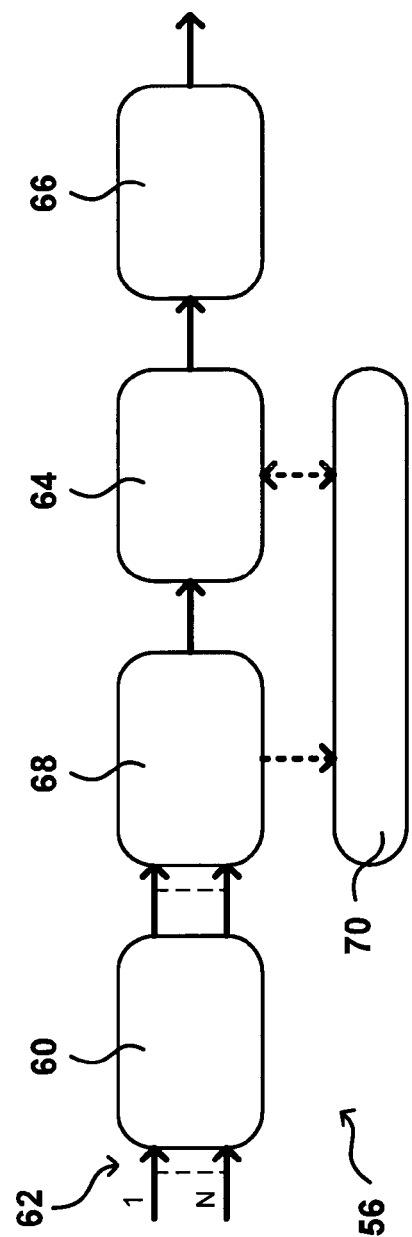
FIG. 9 is a functional illustration of a second, alternative IP network receiver in accordance with the present invention.

An IP receiver 56 for using in a video IP network transmission system implementing the SMPTE 2022 FEC transport protocol is illustrated in FIG. 9. As with the previous IP receiver 36, the IP receiver 56 generally comprises an input interface 60 having a plurality of separate IP packet stream inputs 62; a packet memory 64; and an output 66. When a MPEG-2 TS with FEC is multicast across an IP network or a plurality of MPEG-2 TS with FEC of the same digital video signal are transmitted to the IP receiver 56, each packet stream input 62 of the input interface 60 receives a different one of the plurality of MPEG-2 packet streams.

Figure 10:
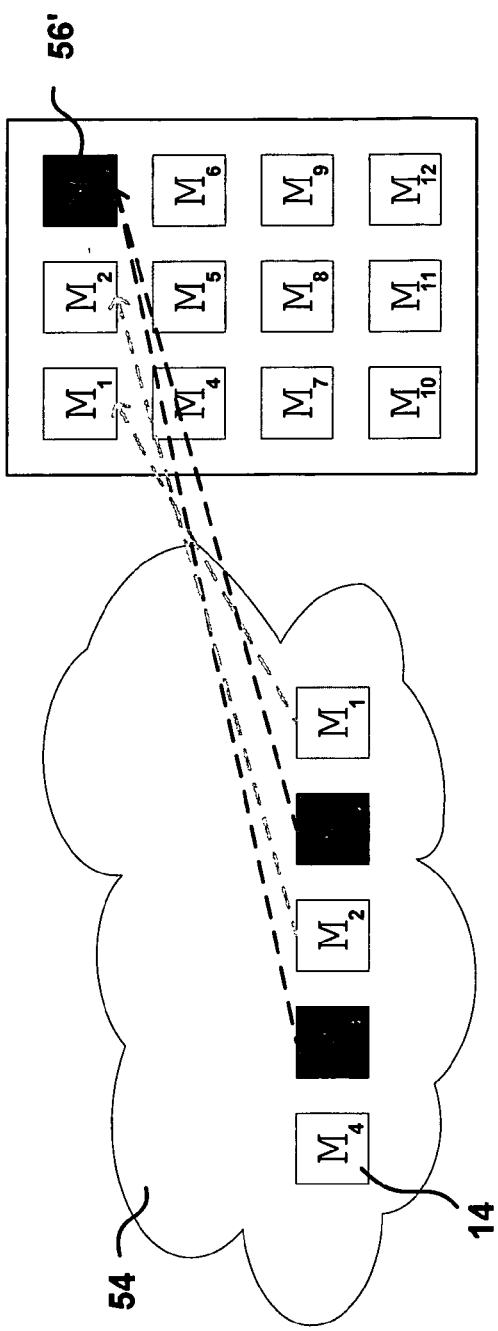
FIG. 10 schematically illustrates the writing of IP packets into an FEC matrix in accordance with the present invention.

Each of the IP packets received at the plurality of packet stream inputs 62 is transferred from the input interface 60 to a packet inspect module 68 which directs IP media packets 14 to the packet memory 64 and the FEC packets 16 to a FEC supervisor 70. The packet memory 64 contains one or more FEC receiver matrixes and the IP media packets 14, forwarded from the packet inspect module 68, are stored at the matrix location specified in the IP media packet's RTP header. Whenever a FEC receiver matrix is found to be missing an IP media packet 14, the FEC supervisor 70 regenerates the missing IP media packet 14 using the FEC packet 16 specific to the row and/or column of the FEC receiver matrix in which a media packet is missing. Regeneration of the missing media packet is performed in the same way as described earlier for the conventional SMPTE 2022 FEC protocol.

Where an IP packet with a particular sequence number is the first received with that sequence number it is written to the packet memory 64 to its respective location in an FEC matrix, as defined by its sequence number. Where an IP packet with a particular sequence number is a duplicate of an identical IP packet previously received, the duplicate IP packet is assigned the same memory location in the same FEC matrix as the earlier identical IP packet and the earlier previously stored identical IP packet is overwritten in the FEC matrix by the later duplicate IP packet. As shown in FIG. 10, by employing a SMPTE 2022 FEC receiver matrix in the IP receiver 56, the RTP sequence number may be used to re-order IP media packets to the correct position and to overwrite duplicate IP packets to those same positions.

Figure 11:
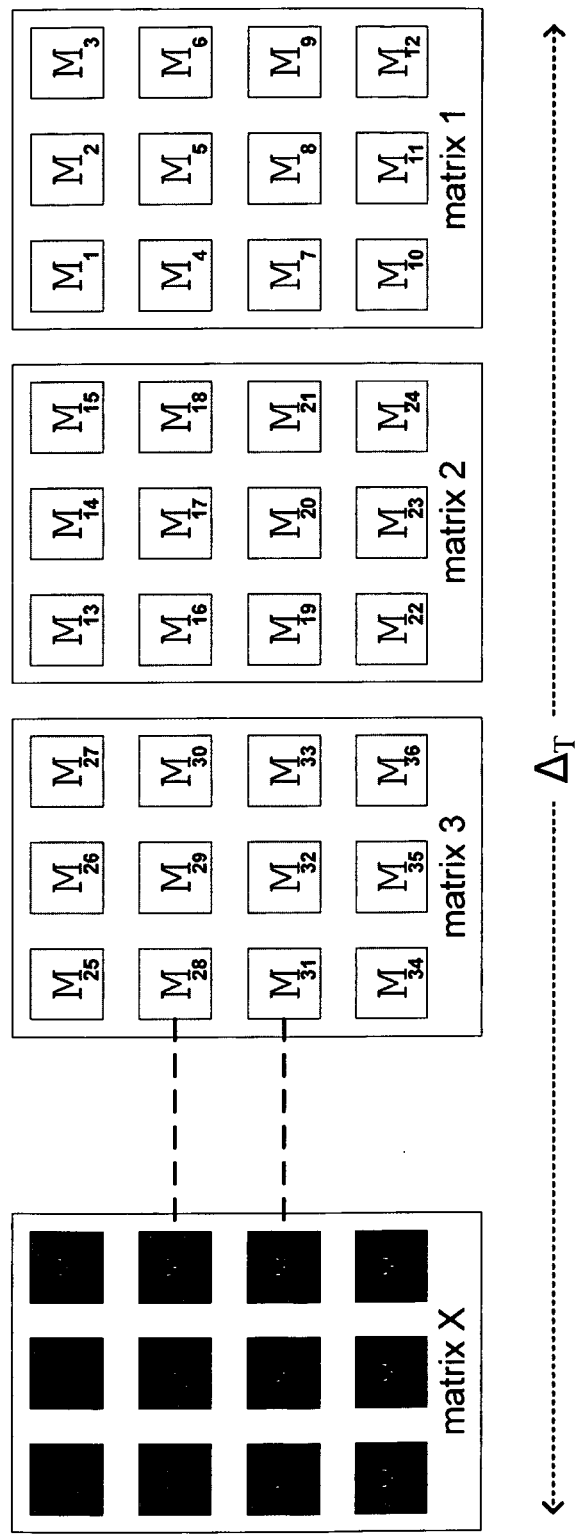
FIG. 11 schematically illustrates the writing of IP packets into multiple FEC matrixes in accordance with the present invention.

As mentioned earlier, the size of the packet memory 64 is preferably sufficient to accommodate the total number of different IP packets received within a time window $2*\Delta_T$. The actual number of different IP packets will depend on the TS media bit rate and the number of FEC matrixes transmitted within the $2*\Delta_T$ time window, the chosen number of TS packets per IP frame and the chosen FEC matrix size (4 to 100 IP packets). Anyhow, as illustrated in FIG. 11 the packet memory 64 will typically have to keep track of a plurality of matrixes.

The FEC packets 16 are stored in a separate FEC supervisor memory (not shown) managed by the FEC supervisor 70. Similar to the IP media packets, duplicate FEC packets overwrite previously stored identical FEC packets. An FEC packet remains in the FEC supervisor memory until all of the media packets to which that FEC packet relates have been read out of the packet memory 64 and only then is that FEC packet deleted by the FEC supervisor 70.

A single packet stream, in which all of the separate packet streams received by the packet stream inputs 52 have been merged, may then be read from the packet memory 64 and output via the receiver output 66.

The following pseudo algorithm is one example of a methodology implementing redundant TS in combination with use of the SMPTE 2022 FEC transport protocol:

i) When the first packet is received start building the first receiver matrix by inserting the IP media packet into the correct position in the receive matrix; and store the arrival time of this packet as metadata together with the IP packet. If necessary build a plurality of empty matrixes: packets from different packet streams may belong to different matrixes because of the different latencies of the different packet streams.

ii) Whenever a new packet arrives, insert the IP media packet in the corresponding receiver matrix.

iii) Whenever a duplicate packet arrives, overwrite both the earlier copy of the same packet in the same location in the corresponding receiver matrix and its arrival time metadata.

iii) Read out the media packet with the lowest sequence number from the receiver matrix $\Delta_T$ seconds after the packet arrived at the IP receiver. This shall cause the packet memory to buffer between $\Delta_T$ and $2*\Delta_T$ of IP media packets at any time.

iv) Whenever a packet is missing in the receiver matrix, the FEC supervisor attempts to re-build the packet. If FEC is not used, or the FEC supervisor is unable to re-build the packet, it shall be regarded as lost and the next non-missing media packet is read out of the receiver matrix.

Network jitter of up to $\Delta_T$ ms may be added to the combined IP stream as a consequence of continuously switching between two (or more) networks. The resulting network jitter can be removed using ordinary network smoothing algorithms, as proposed in ISO/IEC 13818-1 chapter D.0.9— "smoothing of network jitter". Such an algorithm will typically consist of a smoothing buffer to absorb the jitter, and an adjustable play out rate to regenerate the intended TS rate.

The network smoothing buffer should be run half full on average (for constant bit rate streams) or with a constant average IP packet delay (for variable bit rate streams). The receiver matrixes in the packet memory can also function as the network jitter smoothing buffer. The read out time of the packet memory then needs to be controlled such that the original TS rate is re-generated in the combined stream.

In this alternative embodiment the combination of the provision of FEC packet protection on every redundant link with the benefit of link redundancy over several networks significantly reduces problems with packet loss and network link failure. In particular with this combination:
a) in the event of link failure on one or several IP networks, the service delivery can be continued seamlessly without IP packet loss as long as at least one network remains operational and/or two or more intermittently failing networks cumulatively deliver the all necessary packets;
b) even without FEC, there should be no packet loss as long as each IP packet reaches the IP receiver on at least one of the redundant network links within the time window $\Delta_T$;
c) when FEC is used to protect each transmission link, a media IP packet may be lost on all redundant links and still be regenerated from the FEC packets carried in every redundant IP link;
d) when FEC is used to protect each transmission link, even though there is too much packet loss for FEC to recover all IP packets on any single IP link, the combined total of all the redundant networks may still work without packet loss, due to the redundant transmission of both media packets and FEC packets;
e) unlike prior use of redundant IP links, data on the RTP headers of each packet is not stored for comparison purposes to enable duplicates to be identified and discarded reducing memory capacity requirements and processing power requirements in comparison to conventional systems employing redundant IP links. Also, the IP receiver is not required to perform any synchronisation of the multiple input packet streams;
f) protection against packet reordering and packet duplication in inherent to this method and apparatus.

Furthermore, it should be noted that even though SMPTE 2022 is defined for constant bit rate streams, the proposed method will work equally well with both constant and variable bit rate TS streams.

The method and apparatus described herein offer the same benefits as seamlessly switching between several redundant IP network links in terms of correcting both packet drop errors and network link errors for an MPEG-2 TS transmitted over an IP network, using the RTP/UDP/IP protocol.

The proposed method will work equally well with or without SMPTE 2022 FEC and will be operational with 1 to N redundant networks. The only requirement is that the RTP/UDP/IP transmission protocol is used for carrying the MPEG TS packets. The extent of protection from link loss and network packet drops will depend on the number of redundant networks used, and whether SMPTE 2022 FEC is used on the networks.

As mentioned earlier, reference herein to video network transmission and video streams is not intended to be limiting and instead is intended to encompass transmission of video, audio, related data and other multimedia streams.

It should be appreciated that although the invention has been described in the context of UDP packets containing standard transport stream MPEG-2 packets, the invention is not limited to such contexts and may be utilised in other applications and systems that, for example, use other MPEG standards or ITU standards/recommendations for media stream compression. In particular, the invention offers improvements for any standard that uses the real time transport protocol (RTP) as defined in RFC 3550.

The methodologies described herein are performable by a device that includes one or more processors which act in accordance with program instructions. Any device capable of executing a set of instructions that specify actions to be taken by that device is included. A typical device may be exemplified by a processing system that includes one or more processors. The processing system may further include a memory subsystem including RAM and/or ROM and/or other forms of volatile and non-volatile data storage. A bus system may be included for communicating between components. A communications interface for wired or wireless communication with other remote devices may also be included.

It will be understood that the steps of methods described herein are performed by an appropriate processor (or processors) of a processing device executing instructions stored in tangible memory. The term processor may refer to any device or portion of a device that manages the movement of and processes electronic data from registers and/or memory.

Also, in the description herein, well-known methods and structures have not been shown or described in detail in order not to obscure an understanding of this description.

As used herein, unless otherwise specified, the use of the adjectives primary and secondary to describe an object or function merely indicate that different instances of like objects or functions are being referred to, and is not intended to imply that the objects or functions so described must be in a given sequence either temporally, spatially, in ranking or in any other manner.

In the description herein and the claims below, any one of the terms comprising, comprised of or which comprises is an open term that means including at least the elements or steps listed thereafter but not excluding others. Similarly, any one of the terms including or which includes or that includes as used herein is also an open term that also means including at least the elements/features that follow the term, but not excluding others.

The above disclosed subject matter is to be considered illustrative, and not restrictive, and those skilled in the art will recognize that other and further modifications, enhancements and embodiments may be made thereto without departing from the spirit and scope of the present invention. Functionality may be added or deleted from the block diagrams and operations may be interchanged among functional blocks. It is intended that all such changes and modifications fall within the scope of the invention.

The invention claimed is:

1. A method of packet transmission over internet protocol (IP) networks, the method comprising:
receiving from one or more network transmitters a plurality of input IP media broadcast streams, each input stream consisting of a sequence of IP media packets of broadcast data with each IP media packet including header information containing source information identifying the source of the IP media packet and packet ordering data and each input stream representing the same one or more media broadcasts;

buffering in a buffer each IP media packet with respect to its source information and its packet ordering data; and outputting from an output interface an output media broadcast stream using the buffered IP media packets, wherein, where a duplicate IP media packet is received which has identical broadcast data to an IP media packet previously buffered, the previously buffered IP media packet is overwritten by the duplicate IP media packet without comparison of the header information of the duplicate IP media packet with the header information of the previously buffered IP media packet, where the source information and packet ordering data of the duplicate IP media packet are identical to those of the previously buffered IP media packet.

2. The method as claimed in claim 1, wherein each one of the plurality of received input IP media broadcast streams includes forward error correction packets as part of a forward error correction scheme whereby ordering of the IP media packets in the buffer is in accordance with the forward error correction scheme and missing IP media packets are re-created using the forward error correction packets.

3. The method as claimed in claim 2, further comprising the step of monitoring the received input IP media broadcast streams and buffering forward error correction packets separately from the IP media packets.

4. The method as claimed in claim 2, further comprising the step of monitoring the received input IP media broadcast streams and buffering forward error correction packets separately from the IP media packets and wherein, where a duplicate forward error correction packet is received which has identical content to a forward error correction packet previously buffered, the buffered forward error correction packet is overwritten with the duplicate forward error correction packet.

5. The method as claimed in claim 1, wherein the size of the IP media packet buffer is sufficient to store at least the total number of different IP media packets received during a time $2*\Delta T$, where $\Delta T$ is the maximum delay between duplicate IP media packets in different media broadcast streams whereby, after the IP media broadcast streams have been received, no synchronisation of different received media broadcast streams is performed.

6. The method as claimed in claim 1, further comprising an initial step of generating and transmitting a plurality of IP media broadcast streams each on a separate network path, each IP media broadcast stream consisting of a sequence of IP packets of broadcast data representing the same one or more media broadcasts.

7. The method as claimed in claim 6, wherein each of the plurality of IP media broadcast streams is generated in accordance with the SMPTE 2022 FEC transport protocol.

8. A system for packet transmission over internet protocol (IP) networks, the system comprising:

a network transmitter adapted to generate a plurality of IP media broadcast streams, each IP media broadcast stream consisting of a sequence of IP media packets of broadcast data representing the same one or more media broadcasts and with each IP media packet including header information containing source information identifying the source of the IP media packet and packet ordering data, said transmitter being further adapted to transmit each IP media broadcast stream on a different IP network path; and a network receiver, the network receiver having:
 a network interface adapted to receive said plurality of IP media broadcast streams;
 a memory storage in which said IP media packets are buffered according to their source information and their packet ordering data;
 an output interface adapted for outputting a media broadcast stream using the buffered IP media packets; and
 a controller for managing buffering of the IP media packets, the controller being adapted to overwrite a previously buffered IP media packet with a duplicate IP media packet without comparison of the header information of the duplicate IP media packet with the header information of the previously buffered IP media packet, where the source information and packet ordering data of the duplicate IP media packet are identical to those of the previously buffered IP media packet.

9. The system as claimed in claim 8, wherein the network transmitter is further adapted to generate forward error correction packets according to a forward error correction scheme for each IP media broadcast stream and to transmit the forward error correction packets as part of the IP media broadcast stream, and the controller of the network receiver is adapted to order the IP media packets in the memory storage according to the forward error correction scheme.

10. The system as claimed in claim 9, wherein the network receiver further includes second memory storage in which is buffered forward error correction packets separately from the IP media packets.

11. The system as claimed in claim 9, wherein the network receiver further includes second memory storage in which is buffered forward error correction packets separately from the IP media packets and the controller of the network receiver is adapted to overwrite a previously buffered forward error correction packet with a duplicate forward error correction packet.

12. The system as claimed in claim 8, wherein the memory storage is sized to store at least the total number of different IP media packets received during a time $2*\Delta T$, where $\Delta T$ is the maximum delay between duplicate IP media packets in different media broadcast streams whereby, the network receiver does not include means for synchronising the different received IP media broadcast streams.

13. The system as claimed in claim 8, wherein the network transmitter is adapted to generate each of the plurality of IP media broadcast streams in accordance with the SMPTE 2022 FEC transport protocol.

14. A network receiver for the receipt of packet transmissions over internet protocol (IP) networks, the network receiver comprising:

a network interface adapted to receive a plurality of IP media broadcast streams on a respectively plurality of network paths, each IP media broadcast stream consisting of a sequence of IP media packets of broadcast data with each IP media packet including header information containing source information identifying the source of the IP media packet and packet ordering data;

a memory storage in which said IP media packets are buffered according to their source information and packet ordering data;

an output interface adapted for outputting a media broadcast stream using the buffered IP media packets; and a controller for managing buffering of the IP media packets, the controller being adapted to overwrite a previously buffered IP media packet with a duplicate IP media packet without comparison of the header information of the duplicate IP media packet with the header information of the previously buffered IP media packet, where the source information and packet ordering data of the duplicate IP media packet are identical to those of the previously buffered IP media packet.

15. The network receiver as claimed in claim 14, wherein each IP media broadcast stream is in accordance with a forward error correction scheme and includes forward error correction packets, and the controller is adapted to order the IP media packets in the memory storage according to the forward error correction scheme.

16. The network receiver as claimed in claim 15, further including second memory storage in which is buffered forward error correction packets separately from the IP media packets.

17. The network receiver as claimed in claim 15, further including second memory storage in which is buffered forward error correction packets separately from the IP media packets and wherein the controller is adapted to overwrite a previously buffered forward error correction packet with a duplicate forward error correction packet.

18. The network receiver as claimed in claim 14, wherein the memory storage is sized to store at least the total number of different IP media packets received during a time $2*\Delta T$, where $\Delta T$ is the maximum delay between duplicate IP media packets in different media broadcast streams whereby, the network receiver does not include means for synchronising the different received IP media broadcast streams.

* * * * *